United States Patent [19]

Catena

[11] Patent Number: 4,736,515

[45] Date of Patent: Apr. 12, 1988

[54] PLANT FOR AUTOMATED MOUNTING OF A DOOR OR SIMILAR CLOSURE COMPONENT WITHIN THE RELATIVE OPENING FORMED IN A BODY, IN PARTICULAR AN AUTOMOTIVE VEHICLE BODY

[75] Inventor: Nicola Catena, Leumann, Italy

[73] Assignee: Fata European Group S.p.A., Pianezza, Italy

[21] Appl. No.: 872,017

[22] Filed: Jun. 9, 1986

[30] Foreign Application Priority Data

Jun. 21, 1985 [IT] Italy .................. 21267 A/85

[51] Int. Cl.⁴ .................. B23P 21/00; B23Q 15/00
[52] U.S. Cl. .................. 29/714; 29/430; 29/783; 29/785; 29/786; 29/792; 29/794; 29/824
[58] Field of Search .......... 29/783, 785, 786, 822, 29/823, 824, 701, 703, 714

[56] References Cited

U.S. PATENT DOCUMENTS

| | | | |
|---|---|---|---|
| 4,411,354 | 10/1983 | Thibault et al. | 29/430 |
| 4,589,199 | 5/1986 | Ohtaki et al. | 29/824 |
| 4,604,797 | 8/1986 | Kitamura et al. | 29/430 |
| 4,616,411 | 10/1986 | Suzuli et al. | 29/822 |
| 4,627,158 | 12/1986 | Mitoh | 29/824 |

FOREIGN PATENT DOCUMENTS 53-36627 10/1978 Japan .................. 29/824
54-5276 1/1979 Japan .................. 29/824

Primary Examiner—Charlie T. Moon
Attorney, Agent, or Firm—Stevens, Davis, Miller & Mosher

[57] ABSTRACT

The present invention relates to a plant for the automated mounting of a door or similar closure component within the relative opening formed in a body, particularly an automotive vehicle body, comprising in combination: a device (10) for stably supporting a body (11), a conveyor device (33) adapted to convey a door (14) to an approach position to the relative door opening (15) in the body (11), provision being made between the said device (10, 33) for a first movable apparatus (12) for reading the measurements of the opening (15) and a second movable apparatus (13) for removing the door (14) from the conveyor (33) and positioning it within the door opening (15). The apparatus (12, 13) are also operatively interconnected through the intermediary of a computer (31) adapted to accept signals from the apparatus (12), to process them and send them to the apparatus (13). Provision is made, lastly, for actuating means (16) adapted to selectively move the apparatus (12) between an inoperative position and a operative proximal to the door opening (15) and the apparatus (13) between two operative positions proximal respectively to the conveyor (33) and the door opening (15).

1 Claim, 6 Drawing Sheets

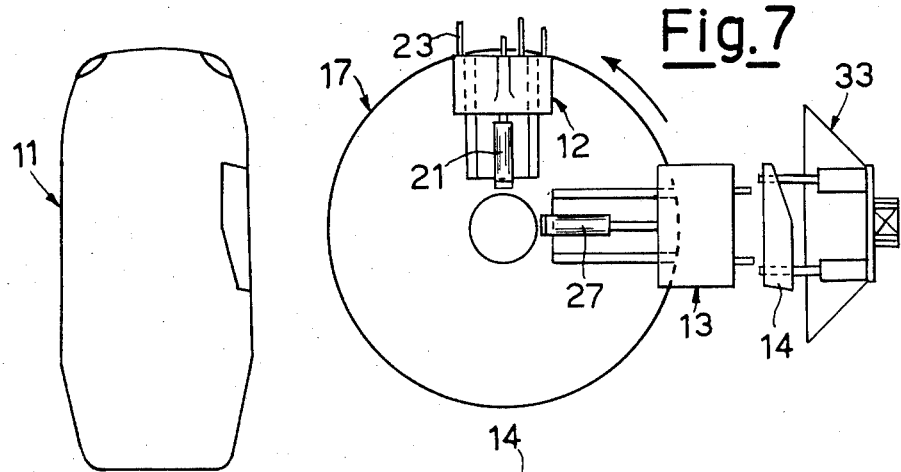
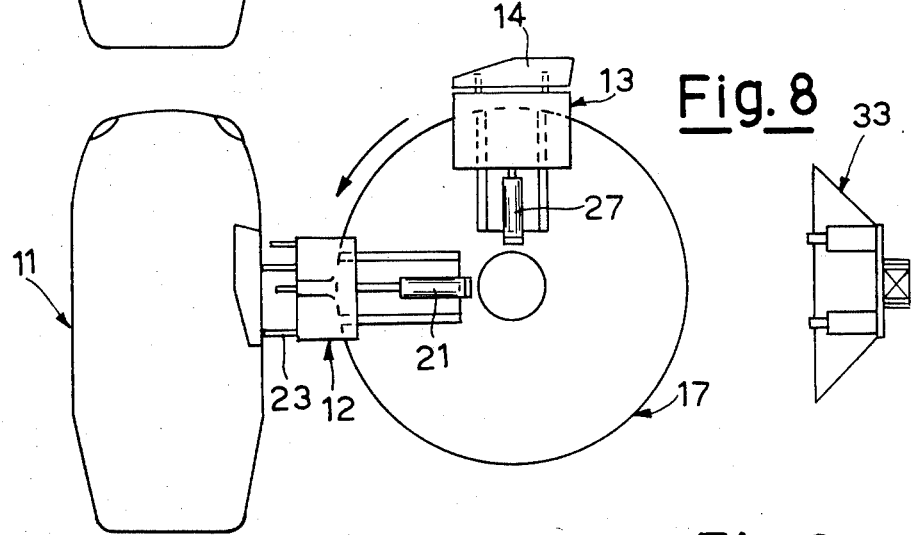
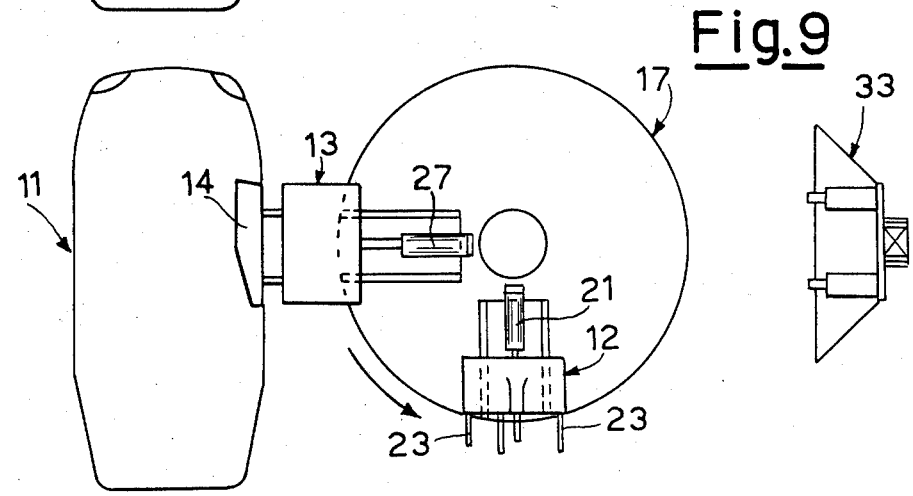

PLANT FOR AUTOMATED MOUNTING OF A DOOR OR SIMILAR CLOSURE COMPONENT WITHIN THE RELATIVE OPENING FORMED IN A BODY, IN PARTICULAR AN AUTOMOTIVE VEHICLE BODY

The present invention relates to an improved plant adapted to mount in an automated manner a door or similar closure component within the relative opening formed in a body, in particular an automotive vehicle body.

As is well known to persons skilled in the art, every effort is now made in the manufacture of automotive vehicles to automate the different steps of the production cycle to the greatest extent possible.

More specifically, when doors are being mounted in the door openings of the body it is preferred to eliminate all the hinge regulation operations conventionally performed after a door has been mounted, such operations being intended to ensure correct door opening and closing relatively to door latches. In order to obviate the said regulation operations, it has been proposed to fix the hinges to the door before this is mounted in the door opening in the automotive vehicle body.

This proposed solution, however, gives rise to the technical problem of mounting the door, fitted with its hinges, in an automated manner with very great precision in positioning the door within the door opening of the body, so as to permit the hinges to be secured to the body in a definitive position, thus allowing significant savings in terms of time and manpower employed.

The overall object of the present invention is to resolve the aforesaid technical problem in a particularly advantageous manner.

To attain this object, the present invention embodies a plant for the automated mounting of a door or similar closure component within the relative opening formed in a body, in particular an automotive vehicle body, wherein there are comprised, in combination: a device for stably supporting a body, a conveyor device adapted to convey a door into an approach position to the relative door opening in the body, provision being made between the said devices for a first movable apparatus for reading the measurements of the door opening and a second movable apparatus for removing the door from the conveyor and positioning it within the door opening, the two apparatus being also operatively interconnected through the intermediary of a computer adapted to accept signals from the first apparatus, to process them and to send them to the second apparatus, provision lastly being made for actuation means adapted selectively to move the second apparatus between an inoperative position and an operative position proximal to the door opening, and the first apparatus between two operaive positions proximal respectively to the conveyor and the door opening.

The structural and functional characteristics of the invention, and its advantages over the known art, will become more apparent from an examination of the following description referred to the appended drawings, in which:

FIGS. 7-9 diagrammatically illustrate the operating steps of the plant according to the invention.

Figure 1:
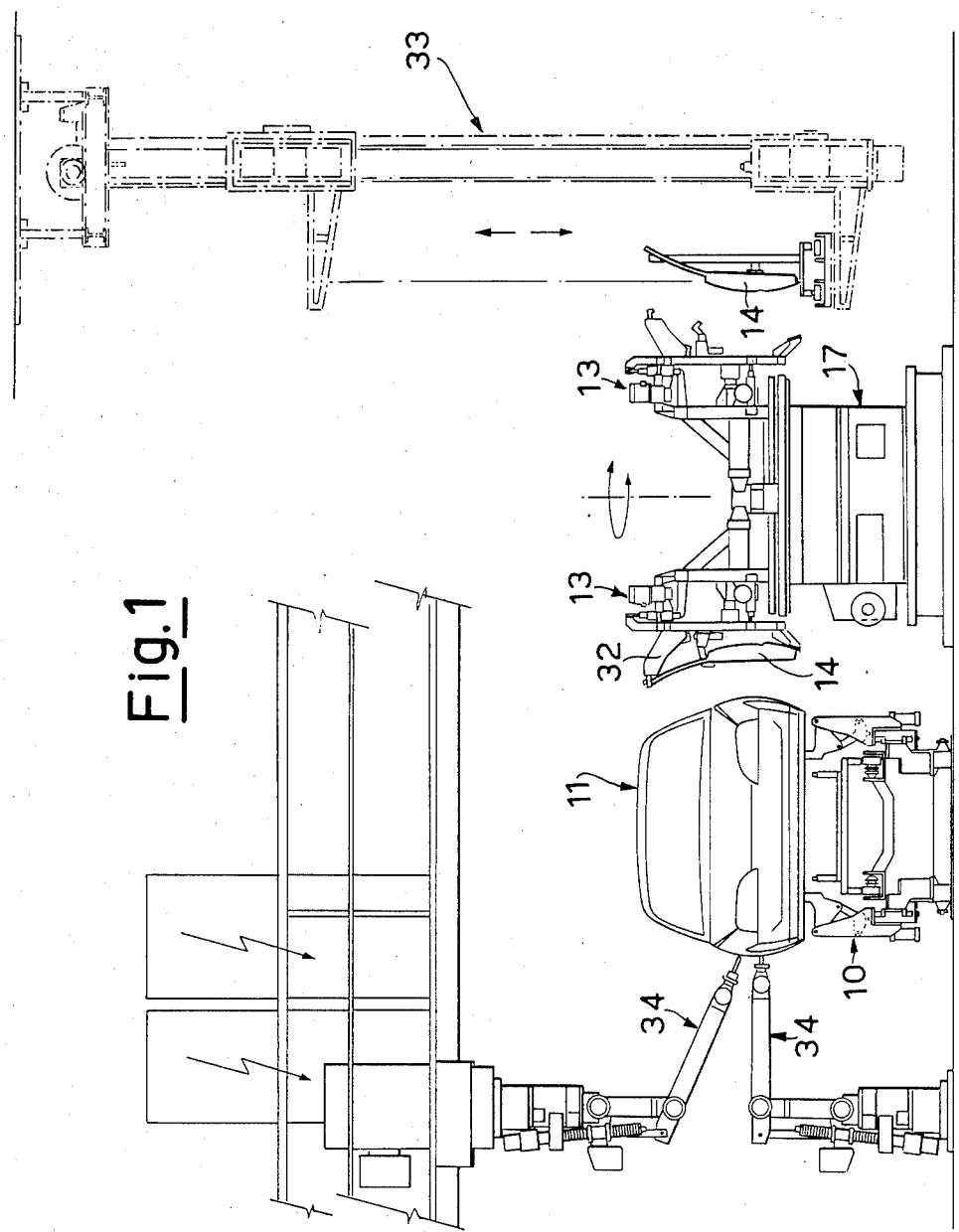
FIG. 1 is an elevational view illustrating an example of plant embodied according to the principles of the present invention for an automated mounting of doors in an automotive vehicle body.
Figure 2:
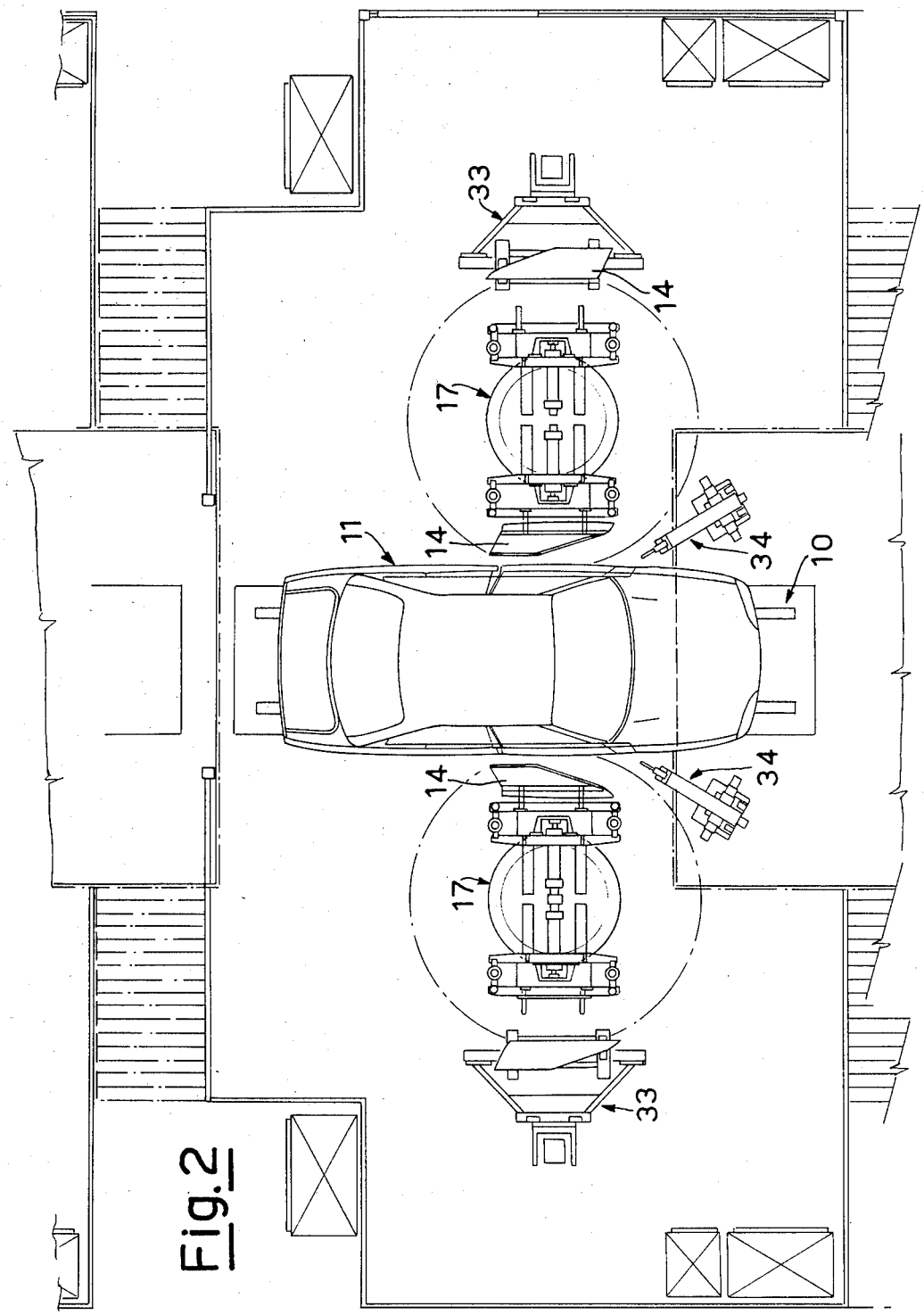
FIG. 2 is a plan view of the plant in FIG. 1.

With reference first to FIGS. 1 and 2 of the drawings, the plant according to the invention comprises a support device 10 adapted to accept from a conveyor line (not shown) located upstream of the device 10 an automotive vehicle body 11 and also adapted to dispose it stably in the correct work position.

The device 10 is not here described in detail, in that it can be of any of the types known to persons skilled in the art of internal industrial conveyors.

Figure 3:
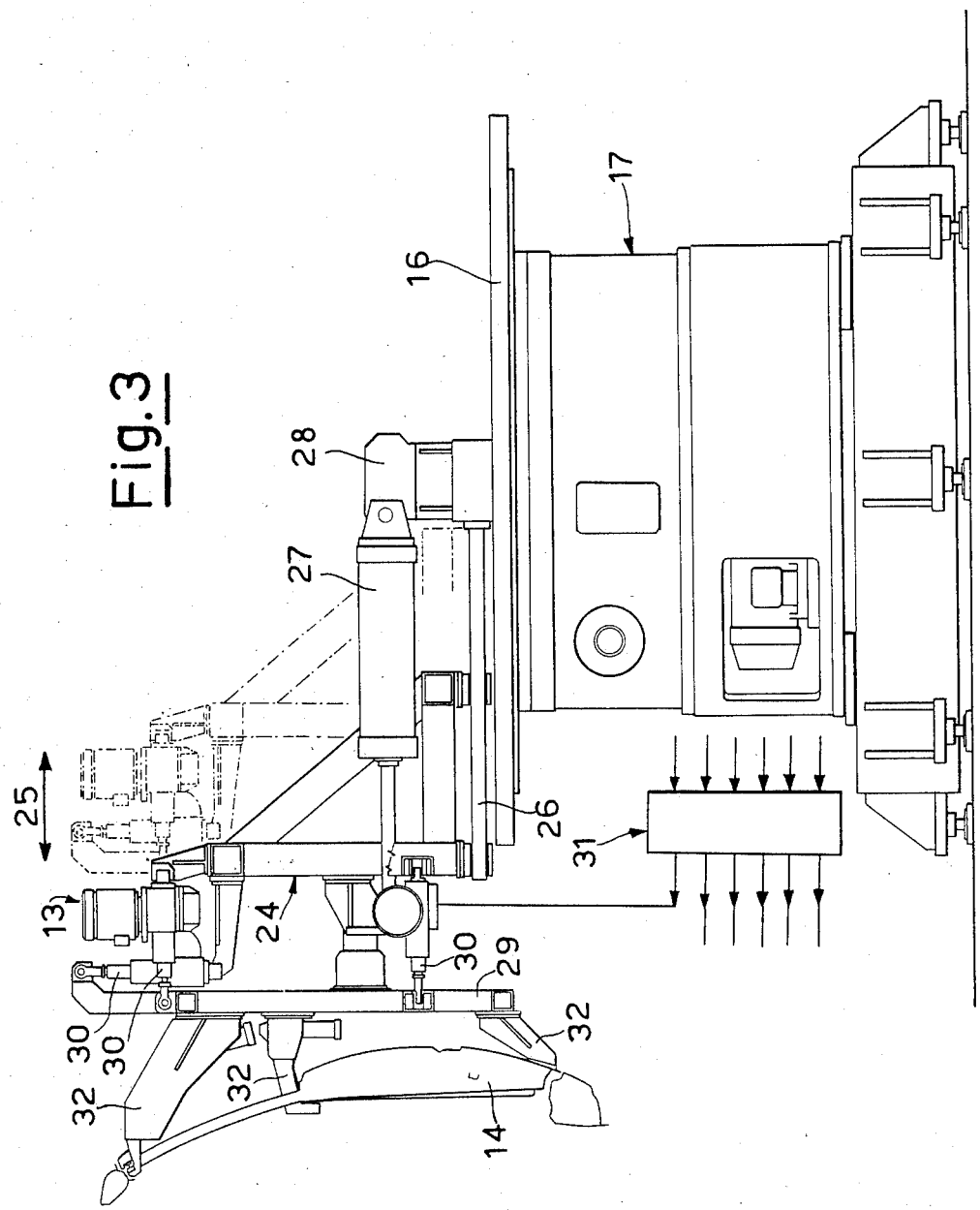
FIG. 3 is an enlarged side elevational view illustrating the apparatus for positioning the door within the relative door opening in the automotive vehicle body.
Figure 4:
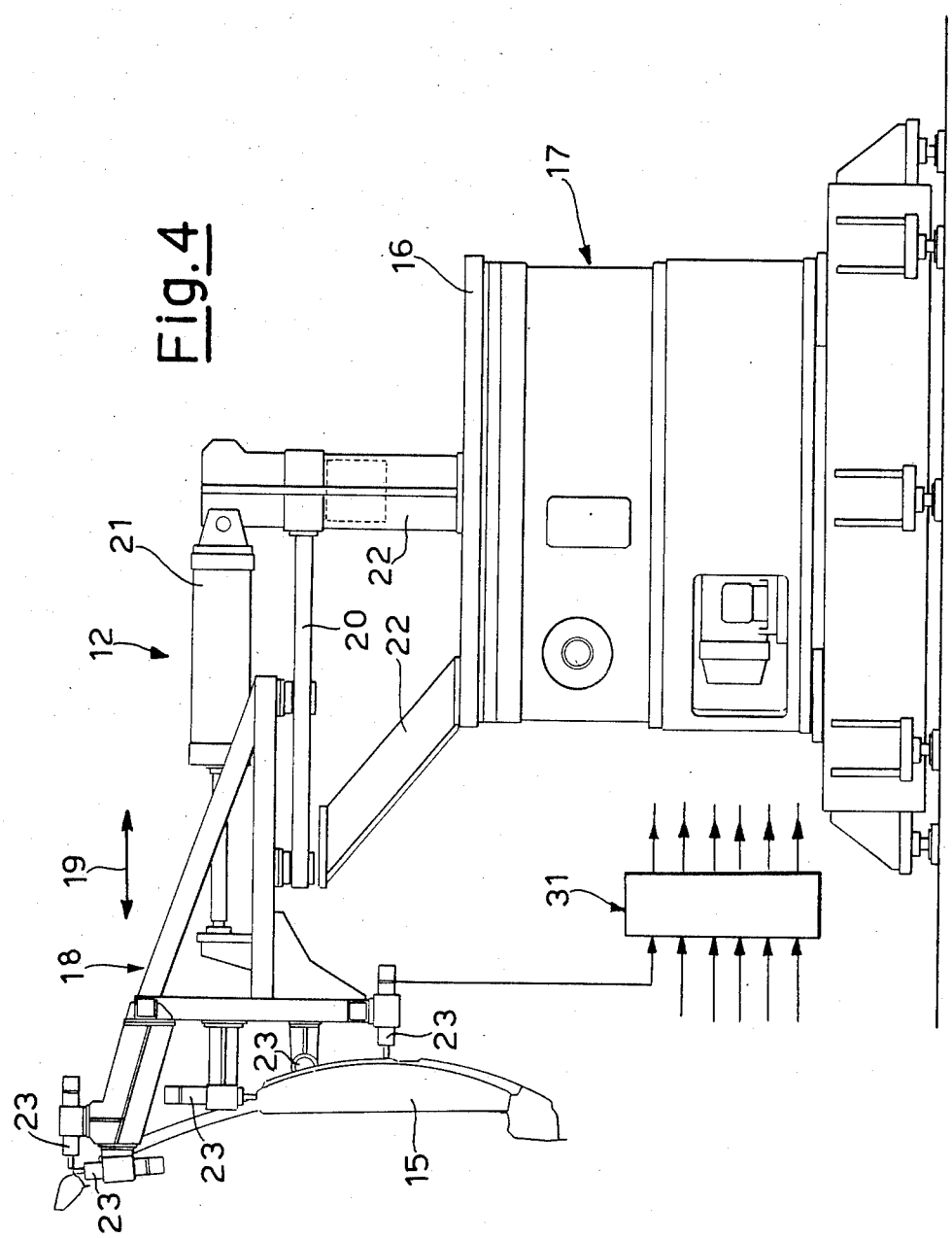
FIG. 4 is a view as in FIG. 3, but illustrating the apparatus for electronically measuring the door opening.

Provision is made on the opposed sides of the device 10 for two pairs of apparatus 12, 13 the function of which is to correctly position a door 14 in the relative door opening 15 of the body 11 (FIGS. 3 and 4). Each pair of the apparatus 12, 13 is mounted on the table 16 of a revolving table 17 controlled to revolve stepwise by known actuating devices which are not shown in detail.

Figure 5:
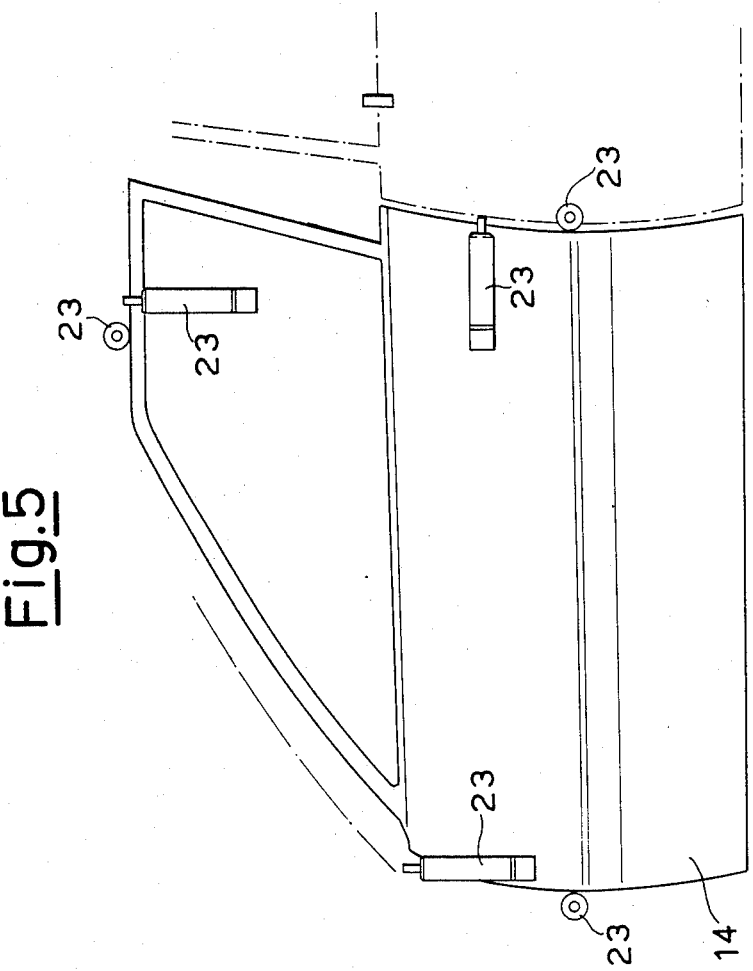
FIGS. 5 and 6 are two diagrammatic views, in front and side elevation respectively, illustrating the disposition of the devices for electronically measuring the door opening in the automotive vehicle body.
Figure 6:
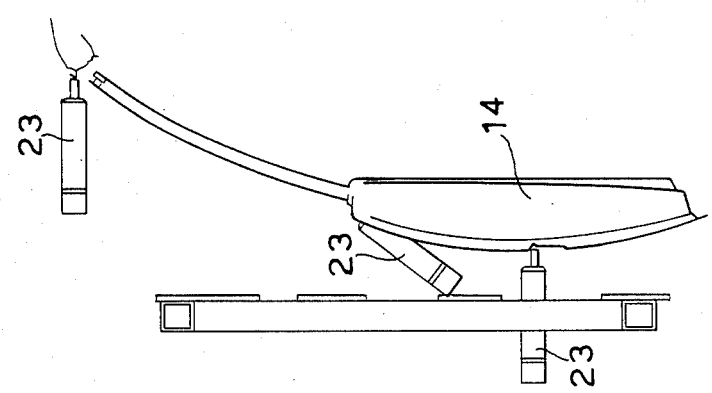

The apparatus 12 comprises a slide 18 translatable in the directions shown by the arrow 19 on guides 20 solid with the table 16. The translation of the slide 18 is controlled for example by a pneumatic cylinder 21 acting between the slide itself and a bearing framework 22. The slide 18 carries frontally a plurality of measuring devices 23 which can be of mechanical type, electromechanical type with encoder or of laser type with television camera, and are pre-set for measuring the door opening 15. This example of embodiment of the invention provides for six encoders 23, disposed with respect to the door opening 15 in the manner clearly shown in FIGS. 4, 5 and 6.

The apparatus 13 (FIG. 3), disposed at 90° to the apparatus 12, comprises a slide 24 translatable in the directions indicated by the arrow 25 on guides 26 solid with the table 16. Such translation of the slide 24 is controlled for example by a pneumatic cylinder 27 acting between the slide itself and a bearing framework 28. The slide 24 carries frontally a frame 29 for supporting and centering the door 14 with respect to the door opening 15. The frame 29 is restrained to the slide 24 through the intermediary of a plurality of linear actuators 30, for example six, of which three are vertical and three are horizontal, along the movement axes foreseen for recouping any deviations in the position of the door 14 with respect to the position of the door opening 15 in which the door is to be mounted. It should be noted that the operating axes of the actuators 30 exactly correspond with those according to the aforementioned encoders 23.

The numeral 31 In FIGS. 3 and 4 of the drawings schematically indicates a computer which accepts the signals from the encoders 23, processes them and sends them to the linear actuators 30.

As is shown diagramatically in FIG. 3 of the drawings, the frame 29 is provided with a series of devices for stably gripping the door 14. These devices are indicated schematically by 32, and are adapted to remove the door 14 from a feed line shown schematically by 33, which can be of any kind appropriate for the purpose (FIG. 1).

The plant described above functions as briefly stated below.

At the start of each operating cycle, an automotive vehicle body 11 is stably placed into position on the support 10 and a door 14 is fed by the conveyor 33 to an approach position to the apparatus 13, which removes it by means of the gripping devices 32 (FIG. 7).

The table 16 is then rotated by 90° (from the position of FIG. 7 to that of FIG. 8), so as to bring the apparatus 12 proximal to the door opening 15 in the body 11 within which the door 14 is to be mounted. The pneumatic cylinder 21, which inserts the encoders 23 into the door opening 15 in the positions shown in FIGS. 4, 5 and 6 of the drawings, then comes into operation.

When the door opening measurement operations have been completed, the apparatus 12, again by means of the pneumatic cylinder 21, is withdrawn towards the centre of the table 16, which is then rotated by a further 90° step into the position of FIG. 9.

During this rotation, the signal processed by the computer 31 and coming from the encoders 23 is sent to the linear actuators 30. Each actuator will receive the signal intended for it and will react accordingly, performing the movement necessary to obtain the tolerance requisite for the correct positioning of the door.

The totality of the movements of the six actuators will then cause the frame 29 supporting the door to attain all the inclinations of the coordinates in the three spatial planes, so assuring the recouping of deviations due to the door opening in the automotive vehicle body.

With the consequent position being maintained, the pneumatic cylinder 27 takes the frame 29 towards the automotive vehicle body and positions the door 14 within the door opening 15. The placement of the door into its door opening in the body causes two industrial robots 34 for each side of the automotive vehicle to commence the welding cycle under CO2, with three welds per hinge. For reasings of operating space one robot is at ground level, while the second is on an overhead platform.

When the welding has been completed, the clamps 32 gripping the door open, and the apparatus 13 is returned to the center of the revolving table through the intermediary of its own pneumatic cylinder 27. Instead of fixing the hinges by welding, thay can be fixed by screwing, again with the aid of suitable robots.

The revolving table 16 then rotates through 180° to return to the start-of-cycle position (FIG. 7), to take off a second door.

At the same time, the automotive vehicle body is released from the support 10 and sent to a successive processing station and a fresh door arrives to enable the mounting cycle to continue.

For the sake of straightforwardness of exposition the plant has been described with reference to one door only, since the matching door on the other side of the automotive vehicle body is mounted simultaneously and in the same manner.

Preferably, the mounting of the front and rear doors takes place in successive stations respectively, which are identical.

The invention is described above by way of non-limiting exemplification with reference to the automotive vehicle sector, in which the term "door" should be understood as including all types of closure present in an automotive vehicle, such as bonnets and luggage compartment hoods and hatchbacks.

It should, however, be noted that the principles of the invention can be equally well follwed in other industrial sectors, such as for example the "white goods" sector.

What is claimed is:

1. A plant for the automated mounting of a door or similar closure component within the relative door opening in a body, in particular an automotive vehicle body, comprising a device (10) for stably supporting an automotive vehicle body (11) having door openings, a conveyor (33) adapted to convey a door (14) into an approach position to the relative door opening (15) in the body (11), a first movable apparatus (12) for reading the measurements of the door opening (15) and a second movable apparatus (13) for removing the door (14) from the conveyor (33) and positioning it within the door opening (15), a computer (31) positioned between said device (10) and conveyor (33) operatively interconnecting said first movable apparatus (12) and said second movable apparatus (13), said computer (31) adapted to accept signals from the apparatus (12), to process them and send them to the apparatus (13), rotatable actuation means (16) adapted selectively to move the apparatus (12) between an inoperative position and an operative position proximal to the said door opening (15), and to move the said apparatus (13) between two operative positions proximal respectively to the conveyor (33) and the door opening (15) and slides (18, 24) upon which said first movable apparatus (12) and said second movable apparatus (13) are mounted and which are translatable with respect to the actuation means (16), said first movable apparatus (12) for reading measurements of the door opening comprising a plurality of door opening measuring devices (23), said second movable apparatus (13) for positioning the door within the door opening comprising a plurality of gripping means (32) for gripping the door (14), which gripping means are mounted on a frame (29) which is position-wise adjustable through the intermediary of a plurality of actuators (30), said actuating means (16) comprising a stepwise revolving table on which the said first and second movable apparatus (12, 13) are mounted.

* * * * *